United States Patent
Liu et al.

(10) Patent No.: US 10,748,354 B2
(45) Date of Patent: Aug. 18, 2020

(54) COMMUNICATION METHOD, DEVICE, AND SYSTEM FOR VEHICLE REMOTE DIAGNOSIS

(71) Applicant: LAUNCH TECH CO., LTD., Shengzhen, Guangdong (CN)

(72) Inventors: Jun Liu, Guangdong (CN); Zhijian Chen, Guangdong (CN); Xiu Chen, Guangdong (CN); Shelin Shen, Guangdong (CN); Liang Zhang, Guangdong (CN); Wei Zhang, Guangdong (CN); Jingrui Li, Guangdong (CN)

(73) Assignee: LAUNCH TECH CO., LTD., Shengzhen, Guangdong (CN)

( * ) Notice: Subject to any disclaimer, the term of this patent is extended or adjusted under 35 U.S.C. 154(b) by 325 days.

(21) Appl. No.: 15/871,909

(22) Filed: Jan. 15, 2018

(65) Prior Publication Data
US 2018/0286146 A1    Oct. 4, 2018

Related U.S. Application Data

(63) Continuation-in-part of application No. PCT/CN2017/078561, filed on Mar. 29, 2017.

(51) Int. Cl.
*G07C 5/00* (2006.01)
*G07C 5/08* (2006.01)
*H04L 29/08* (2006.01)

(52) U.S. Cl.
CPC .......... *G07C 5/008* (2013.01); *G07C 5/0808* (2013.01); *H04L 67/025* (2013.01); *H04L 67/12* (2013.01)

(58) Field of Classification Search
CPC ..... G07C 5/008; G07C 5/0808; H04L 67/025; H04L 67/12; H04M 1/72522;
(Continued)

(56) References Cited

U.S. PATENT DOCUMENTS

| 8,897,952 B1* | 11/2014 | Palmer | G07C 5/008 |
| | | | 701/31.5 |
| 9,349,223 B1* | 5/2016 | Palmer | G07C 5/008 |

(Continued)

FOREIGN PATENT DOCUMENTS

| CN | 101621735 A | 1/2010 |
| CN | 102968112 A | 3/2013 |

(Continued)

OTHER PUBLICATIONS

Lee et al., Extended communication interface for remote vehicle diagnosis using Internet Protocol, 2013, IEEE, p. 421-426 (Year: 2013).*

(Continued)

*Primary Examiner* — Mcdieunel Marc
(74) *Attorney, Agent, or Firm* — Hamre, Schumann, Mueller & Larson, P.C.

(57) ABSTRACT

The present application provides a communication method for vehicle remote diagnosis, which is applied to a WEB server; the method comprises: establishing a first socket connection with the WEB front end when receiving a landing request of the WEB front end; receiving a vehicle remote diagnosis request of the WEB front end through the first socket connection and obtaining an identification of a target vehicle diagnosis equipment carried in the vehicle remote diagnosis request; establishing a second socket connection with the target vehicle diagnosis equipment according to the identification of the target vehicle diagnosis equipment; performing interaction of the vehicle diagnosis data between the WEB front end and the target vehicle diagnosis equipment through the first socket connection and the second socket connection. The application also provides a communication device and system for vehicle remote (Continued)

diagnosis. The application can improve the real-time capability and convenience of vehicle remote diagnosis.

15 Claims, 4 Drawing Sheets

(58) Field of Classification Search
CPC .. H04M 3/493; H04M 3/5183; H04M 3/4211; H04M 3/5166; H04M 2203/551; H04M 2203/5183; H04M 1/56; H04M 1/677; H04W 4/16; G06Q 30/0633
See application file for complete search history.

(56) References Cited

U.S. PATENT DOCUMENTS

| | | | |
|---|---|---|---|
| 10,109,201 B2* | 10/2018 | Smith | G08G 1/207 |
| 10,142,420 B2* | 11/2018 | Lei | B60L 58/12 |
| 10,146,521 B2* | 12/2018 | West | G06F 8/65 |
| 2007/0050126 A1 | 3/2007 | Nou | |
| 2015/0237189 A1* | 8/2015 | Schultz | H04M 3/4211 455/414.1 |
| 2016/0055686 A1 | 2/2016 | Ukai et al. | |

FOREIGN PATENT DOCUMENTS

| | | |
|---|---|---|
| CN | 103095799 A | 5/2013 |
| CN | 104494601 A | 4/2015 |

OTHER PUBLICATIONS

Lin et al., Development of On-Line Diagnostics and Real Time Early Warning System for Vehicles, 2005, IEEE, p. 1-7 (Year: 2005).*
Deb et al., Remote Diagnosis Server, 2000, IEEE, p. 1-8 (Year: 2000).*
Liyuan et al., Remote diagnosis system of vehicle based on telematics, 2010, IEEE, p. 217—(Year: 2010).*
The extended European search report issued in European Application No. 17893512.8, dated Nov. 8, 2019.
International Search Report (English and Chinese) and Written Opinion issued in PCT/CN2017/078561, dated Jan. 4, 2018, 8 pages provided.

* cited by examiner

COMMUNICATION METHOD, DEVICE, AND SYSTEM FOR VEHICLE REMOTE DIAGNOSIS

CROSS REFERENCE TO RELATED APPLICATIONS

This is a continuation-in-part of International Application PCT/CN2017/078561, with an international filing date of Mar. 29, 2017. The contents of the PCT application are incorporated herein by reference in its entirety.

TECHNICAL FIELD

The present application relates to the technical field of vehicles, and more particularly relates to a communication method, a device, and a system for vehicle remote diagnosis.

BACKGROUND

With the rapid development of the automobile industry, electronic control technology has entered the various components of an automobile, and with the increase of the complexity of the structure of the automobile, fault diagnosis and elimination for vehicles have become important technical requirements and security guarantees. The vehicle remote diagnosis can achieve the remote diagnosis and consultation to fault vehicles of inexperienced technicians or non-professional staff, such that the advantage of professional automobile technicians can be brought into full play.

In the existing remote diagnosis technology of vehicles, the professionals obtain vehicle diagnosis data collected by remote diagnosis equipment in the sites of the vehicle through near-end diagnosis equipment, so as to realize the diagnosis for the vehicle fault. This method has the following limitations:

On one hand, the near-end diagnosis equipment is generally professional diagnosis equipment (for example, a professional computer with a special operating system), and the equipment must be stalled with a relevant diagnosis APP or other diagnosis program; in the event of the automobile fault, since ordinary users cannot use these equipment to run the program anytime and anywhere, the convenience is very low, and it is inconvenient for the promotion of the remote diagnosis technology; on the other hand, due to the restriction of network transmission condition, only some simple data interchanges, such as unidirectional document viewing and data reception, and sending some simple commands, etc., can be achieved between near-end diagnosis equipment and remote diagnosis equipment, which cannot be applied to the occasions where the requirement for the real-time performance and complexity of vehicle diagnosis is higher.

SUMMARY OF THE PRESENT APPLICATION

A main object of the present application is to provide a communication method, device and system for vehicle remote diagnosis, aiming at improving the real-time performance and convenience of vehicle remote diagnosis.

In order to achieve the above object, the present application provides a communication method for vehicle remote diagnosis, which comprises the following steps:

establishing a first socket connection with a WEB front end when receiving a landing request of the WEB front end;

receiving a vehicle remote diagnosis request of the WEB front end through the first socket connection and obtaining an identification of a target vehicle diagnosis equipment carried in the vehicle remote diagnosis request;

establishing a second socket connection with the target vehicle diagnosis equipment according to the identification of the target vehicle diagnosis equipment; and performing the interaction of vehicle diagnosis data between the WEB front end and the target vehicle diagnosis equipment through the first socket connection and the second socket connection.

Optionally, the step of performing the interaction of the vehicle diagnosis data between the WEB front end and the target vehicle diagnosis equipment through the first socket connection and the second socket connection comprises:

obtaining the vehicle original diagnosis data collected by the target vehicle diagnosis equipment through the second socket connection; and sending the obtained vehicle original diagnosis data through the first socket connection to the WEB front end for display.

Optionally, after the step of sending the obtained vehicle original diagnosis data through the first socket connection to the WEB front end for display, the method further comprises:

receiving a vehicle remote diagnosis instruction sent from the WEB front end through the first socket connection; and sending the received vehicle remote diagnosis instruction by the second socket connection to the target vehicle diagnosis equipment.

Optionally, the step of establishing the second socket connection with the target vehicle diagnosis equipment according to the identification of the target vehicle diagnosis equipment comprises:

obtaining a vehicle diagnosis equipment management list;

checking whether the target vehicle diagnosis equipment exists in the vehicle diagnosis equipment management list or not according to the identification of the target vehicle diagnosis equipment;

if yes, judging whether the target vehicle diagnosis equipment is in an online status or not; and establishing the second socket connection with the target vehicle diagnosis equipment when the target vehicle equipment is in the online status.

Optionally, after the step of judging whether the target vehicle diagnosis equipment is in the online status or not, the method further comprises:

judging whether the WEB server and the target vehicle diagnosis equipment are in a same wireless network or not when the target vehicle diagnosis equipment is in an offline status;

if yes, sending a start instruction to the target vehicle diagnosis equipment via the wireless network; and establishing a second socket connection with the target vehicle diagnosis equipment when it is detected that the target vehicle diagnosis equipment is activated.

Moreover, in order to achieve the above object, the present application further provides a communication device for vehicle remote diagnosis, which comprises a memory configured to store a program code; and a processor coupled to the memory, wherein the program code causes the processor to be configured to:

establish a first socket connection with a WEB front end when receiving a landing request of the WEB front end;

receive a vehicle remote diagnosis request of the WEB front end through the first socket connection and obtaining the identification of the target vehicle diagnosis equipment carried in the vehicle remote diagnosis request;

establish a second socket connection with the target vehicle diagnosis equipment according to the identification of the target vehicle diagnosis equipment; and perform the interaction of a vehicle diagnosis data between the WEB front end and the target vehicle diagnosis equipment through the first socket connection and the second socket connection.

Optionally, the communication device for vehicle remote diagnosis, wherein the program code causes the processor to be configured to perform the interaction of a vehicle diagnosis data between the WEB front end and the target vehicle diagnosis equipment through the first socket connection and the second socket connection, specifically comprises:

Obtaining the vehicle original diagnosis data collected by the target vehicle diagnosis equipment through the second socket connection; and sending the obtained vehicle original diagnosis data through the first socket connection to the WEB front end for display.

Optionally, the communication device for vehicle remote diagnosis, wherein after sending the obtained vehicle original diagnosis data through the first socket connection to the WEB front end for display, the program code further causes the processor to be configured to:

receive through the first socket connection the vehicle remote diagnosis instruction sent from the WEB front end; and send the received vehicle remote diagnosis instruction by the second socket connection to the target vehicle diagnosis equipment.

Optionally, the communication device for vehicle remote diagnosis, wherein the program code causes the processor to be configured to establish the second socket connection with the target vehicle diagnosis equipment according to the identification of the target vehicle diagnosis equipment, specifically comprises:

obtaining a vehicle diagnosis equipment management list;

checking whether the target vehicle diagnosis equipment exists in the vehicle diagnosis equipment management list or not according to the identification of the target vehicle diagnosis equipment;

If yes, judging whether the target vehicle diagnosis equipment is in an online status or not; and establishing the second socket connection with the target vehicle diagnosis equipment when the target vehicle equipment is in the online status.

Optionally, the communication device for vehicle remote diagnosis, wherein after judging whether the target vehicle diagnosis equipment is in the online status or not, the program code further causes the processor to be configured to:

judge whether the WEB server and the target vehicle diagnosis equipment are in a same wireless network or not when the target vehicle diagnosis equipment is in an offline status;

if yes, send a start instruction to the target vehicle diagnosis equipment via the wireless network; and establish a second socket connection with the target vehicle diagnosis equipment when it is detected that the target vehicle diagnosis equipment is activated.

Moreover, in order to achieve the above object, the present application further provides a communication system for vehicle remote diagnosis, which comprises a WEB server, a WEB front end and a target vehicle diagnosis equipment, among them, the WEB server comprises the above-mentioned device;

the WEB front end is configured to send a landing request to the WEB server and establish a first socket connection with the WEB server; and to send a vehicle remote diagnosis request to the WEB server through the first socket connection, wherein the vehicle remote diagnosis request carries an identification of a target vehicle diagnosis equipment; and the target vehicle diagnosis equipment is configured to establish a second socket connection with the WEB server.

Optionally, the target vehicle diagnosis equipment is further configured to acquire vehicle original diagnosis data, and send the acquired vehicle original diagnosis data to the target vehicle diagnosis equipment through the second socket connection; and the WEB front end is further configured to display the vehicle original diagnosis data sent from the WEB server through the first socket connection.

Optionally, the WEB front end is further configured to send a vehicle remote diagnosis instruction to the WEB server through the first socket connection; and the target vehicle diagnosis equipment is further configured to receive through the second socket connection the vehicle remote diagnosis instruction sent from the WEB front end.

Optionally, the target vehicle diagnosis equipment is further configured to: establish the second socket connection with the WEB server when it exists in a vehicle diagnosis equipment management list of the WEB server and is in an online status.

Optionally, the target vehicle diagnosis equipment is further configured to receive a start instruction of the WEB server when it exists in the vehicle diagnosis equipment management list of the WEB server and is in an offline status; and establish the second socket connection with the WEB server according to the start instruction.

The WEB server according to the application establishes a first socket connection with the WEB front end when receiving a landing request of the WEB front end; receives a vehicle remote diagnosis request of the WEB front end through the first socket connection and obtains the identification of the target vehicle diagnosis equipment carried in the vehicle remote diagnosis request; establishes a second socket connection with the target vehicle diagnosis equipment according to the identification of the target vehicle diagnosis equipment; and performs the interaction of the vehicle diagnosis data between the WEB front end and the target vehicle diagnosis equipment through the first socket connection and the second socket connection. The present application, by establishing the first socket connection. between the WEB server and the WEB front end, and establishing the second socket connection between the WEB server and the target vehicle diagnosis equipment, can. enable a real-time interaction of the vehicle diagnosis data to be performed between the WEB front end and the target vehicle diagnosis equipment via the WEB server, thereby improving the real-time performance and the convenience of vehicle remote diagnosis.

The realization, functional features and advantages of the present application will be further described with reference to the accompanying drawings.

DETAILED DESCRIPTION OF THE EMBODIMENT

It should be understood that the specific embodiments described herein are only intended to illustrate but not to limit the present application.

The present application provides a communication for vehicle remote diagnosis.

Figure 1:
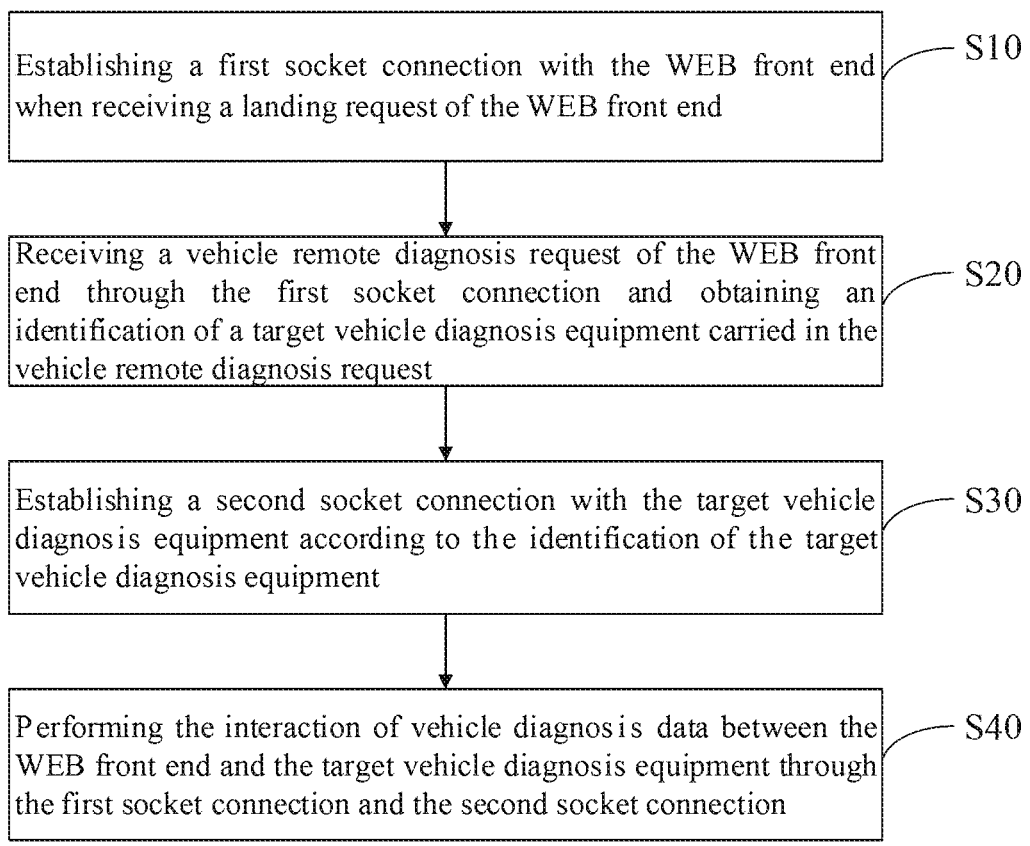
FIG. 1 is a schematic flowchart of a first embodiment of a communication method for vehicle remote diagnosis according to the present application.

As shown in FIG. 1, FIG. 1 is a schematic flowchart of a first embodiment of a communication method for vehicle remote diagnosis according to the present application. The method comprises the following steps:

Step S10, establishing a first socket connection with a WEB front end when receiving a landing request of the WEB front end.

The communication method for vehicle remote diagnosis according to the present application is applied to the WEB server. First, the WEB server receives the landing request of the WEB front end, and establishes the first socket connection with WEB front end, wherein the WEB front end includes the WEB page and the related code that can interact with the user. At present, the socket connection between the WEB front end and the WEB server is established on the fifth generation of hypertext markup language (HTML5), and the HTML5 is the network communication standards of hypertext markup language after a fifth major modification, the socket connection based on the standards can be recorded as HTML5 Websocket connection, a real-time interaction of the network can be supported by the connection.

The application scenario of the present embodiment can be that: the user needs to remotely diagnose his vehicle at a certain time when the user opens the browser using the mobile phone to access the corresponding website, and then inputs the user name and password on the webpage displayed on the website and sends the landing request to the WEB server, the correctness of the username and the password will be verified by the WEB server when the landing request has been received, and the HTML5 Websocket connection with the WEB front end will be established if it is right.

In the above application scenario, the web front end used by the user can be any device that can access the network, such as a smartphone, tablet computer, notebook, etc., and a relevant diagnostic APP or the other diagnosis program do not need to be downloaded or installed in the near-end device by the user; in addition, the establishment of the HTML5 Websocket connection is also unaffected by the system platform of the near-end diagnosis equipment, that is, the web front end can carry any operating system, such as Windows, Linux, IOS, Android and so on. To smart phone, for example, the user can generally access to the corresponding automobile remote diagnosis website via commonly used mobile APPs, such as a browser or WetChat Official Accounts, and so on, and establish the HTML5 Websocket connection between the WEB front end (WEB page) and the WEB server, thus is very convenient to use.

Step S20, receiving a vehicle remote diagnosis request of the WEB front end through the first socket connection and obtaining an identification of a target vehicle diagnosis equipment carried in the vehicle remote diagnosis request;

Step S30, establishing a second socket connection with the target vehicle diagnosis equipment according to the identification of the target vehicle diagnosis equipment;

When the HTML5 Websocket connection between the WEB server and the WEB front end has been established, the data interaction between the WEB server and WEB front end via the connection can be performed. Specifically, the user enters the target vehicle diagnosis equipment identification information that need to be connected through the WEB page, such as the device type, the name, etc., and sends the remote diagnosis request to the WEB server; the WEB server receives the vehicle remote diagnosis request of the WEB front end, and establishes the second socket connection with the target vehicle diagnosis equipment according to the target vehicle diagnosis equipment identification carried in the request, wherein this connection can be recorded as a TCP/IP Socket connection.

It should be noted that the target vehicle diagnosis device of the present embodiment is connected to an ECU (Electronic Control Unit) for acquiring the vehicle original diagnosis data including the vehicle's real-time fuel consumption, engine water temperature, engine speed, vehicle mileage, current speed, battery voltage, intake pressure, coolant temperature, oxygen sensor voltage, engine load, throttle opening, ignition timing, air flow and the other data. The target vehicle diagnosis equipment includes, but is not limited to, such as OBD (On-Board Diagnostics) connectors, motor vehicle products, and the diagnosis equipment independently installed in the vehicle and connected with the CAN-BUS (Controller Area Network-BUS) and so on.

Step S40, performing the interaction of the vehicle diagnosis data between the WEB front end and the target vehicle diagnosis equipment through the first socket connection and the second socket connection.

After the first socket connection (i.e., the HTML5 Websocket connection) has been established between the WEB server and the WEB front end, and the second socket connection (i.e., the TCP/IP Socket connection) has been established between the WEB server and the target vehicle diagnosis equipment, the interaction of the vehicle diagnosis data between the WEB front end and the target vehicle diagnosis equipment can then be executed by the established first socket connection and the second socket connection.

In this embodiment, through the establishment of the first socket connection between the WEB server and the WEB front end, and the establishment of the second socket connection between the WEB server and the target vehicle diagnosis equipment, a real-time interaction of the vehicle diagnosis data can be performed between the WEB front end and the target vehicle diagnosis equipment via the WEB server, thereby improving the real-time performance and convenience of the vehicle remote diagnosis.

Figure 2:
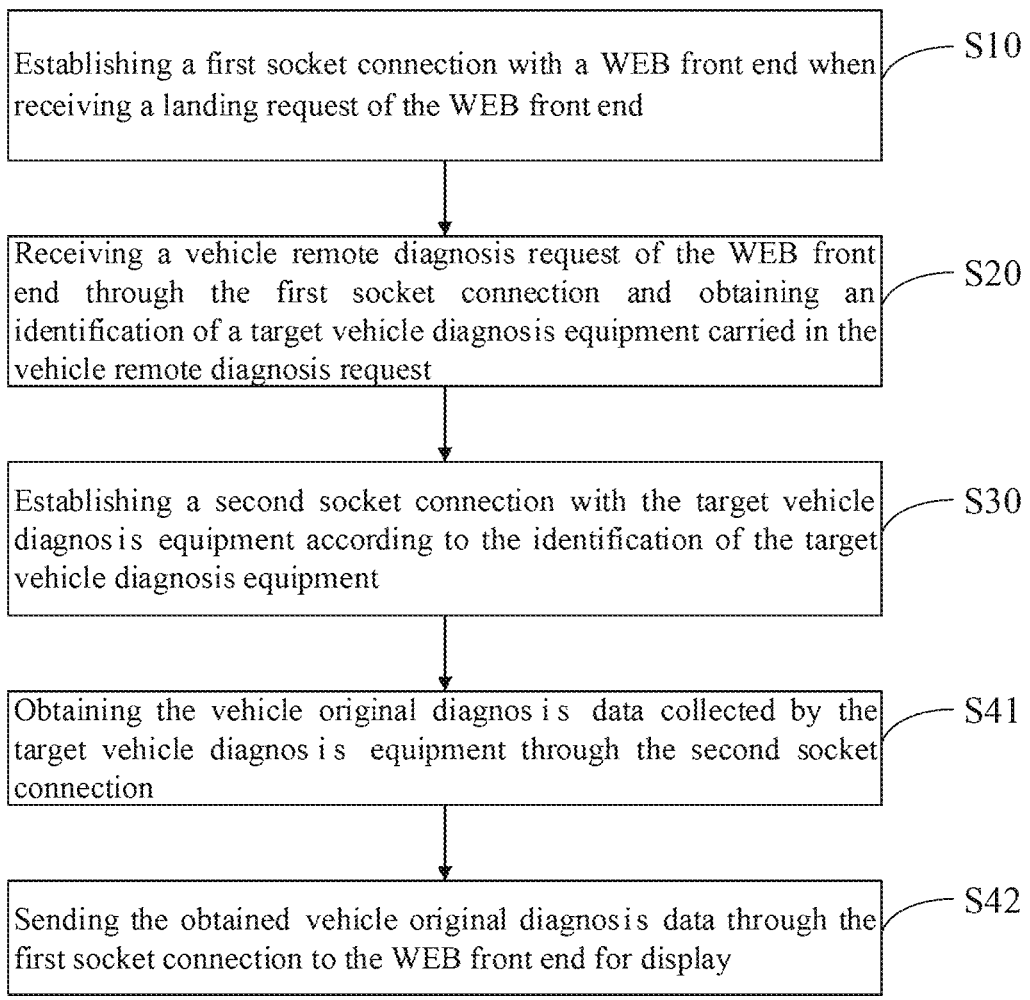
FIG. 2 is a schematic flowchart of a second embodiment of a communication method for vehicle remote diagnosis according to the present application.

Further, with reference to FIG. 2, FIG. 2 is a schematic flowchart of a second embodiment of a communication method for vehicle remote diagnosis according to the present application. Based on the aforesaid embodiment shown in FIG. 1, Step S40 may comprise:

Step S41, obtaining the vehicle original diagnosis data collected by the target vehicle diagnosis equipment through the second socket connection; and Step S42, sending the obtained vehicle original diagnosis data through the first socket connection to the WEB front end for display.

In this embodiment, the WEB server obtains the vehicle original diagnosis data collected by the target vehicle diagnosis equipment through the TCP/IP Socket connection and sends the obtained vehicle original diagnosis data through the HTML5 Websocket connection to the WEB front end for display, in this process, the vehicle original diagnosis data can be processed by the WEB server based on the HTML5 to ensure that its normal display on the diagnosis interface of the WEB front end. As the real-time performance of the data transmission of the Socket connection is very high, the diagnosis data on the diagnosis interface should be changed in real time, thus, the user can monitor the vehicle diagnosis data in real time though the WEB page.

Further, after the Step S42, the method may further comprise:

Step S43, receiving a vehicle remote diagnosis instruction sent from the WEB front end through the first socket connection;

Step S44, sending the received vehicle remote diagnosis instruction by the second socket connection to the target vehicle diagnosis equipment.

The user can remotely diagnose the vehicle according to the vehicle original diagnosis data displayed on the WEB page. Specifically, the user can send the vehicle remote diagnosis instruction to the WEB server based on the WEB page, the vehicle remote diagnosis instruction includes but not limited to fault diagnosis, fault clearing, real-time data reading, action testing (such as unlocking, whistle), ECU programming, ECU flushing, and so on. The WEB server receives the vehicle remote diagnosis instruction sent from the WEB front end through the HTML5 Websocket connection and sends the received vehicle remote diagnosis instruction to the target vehicle diagnosis equipment through the TCP/IP Socket connection to enable the target vehicle diagnosis equipment to control the vehicle ECU unit to perform the corresponding function. As the data transmission of the Socket connection supports the bidirectional transmission, the user can obtain the current diagnosis status and the diagnosis results of the vehicle through the diagnosis interface, thereby achieving the user's remote diagnosis of the vehicle.

In this embodiment, through the establishment of the first socket connection (i.e., the HTML5 Websocket) between the WEB server and the WEB front end, and the establishment of the second socket connection (i.e., the TCP/IP Socket connection) between the WEB server and the target vehicle diagnosis equipment, the user can perform the real-time data exchange through the display interface of the WEB front end and the ECU unit of the vehicle, thereby improving the real-time performance and convenience of the vehicle remote diagnosis.

Figure 3:
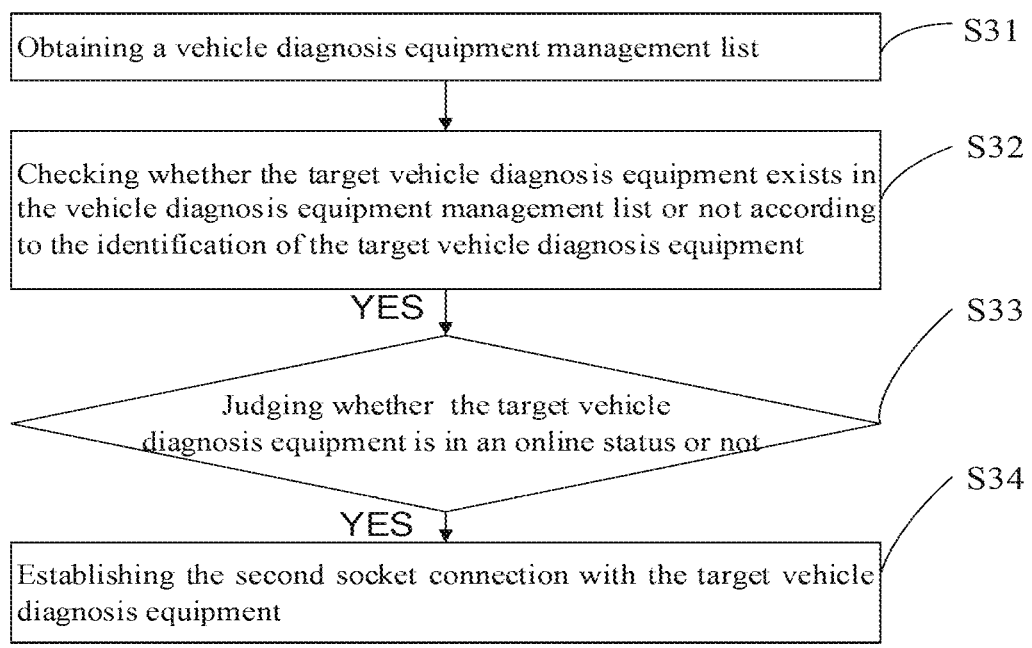
FIG. 3 is a detailed step schematic diagram of step S30 of a communication method for vehicle remote diagnosis according to the present application.

Further, with reference to FIG. 3, FIG. 3 is a detailed step schematic diagram of step S30 of a communication method for vehicle remote diagnosis according to the present application. Based on the embodiment shown in the FIG. 1, the Step S30 may comprise:

Step S31, obtaining a vehicle diagnosis equipment management list;

Step S32, checking whether the target vehicle diagnosis equipment exists in the vehicle diagnosis equipment management list or not according to the identification of the target vehicle diagnosis equipment;

Step S33, if the target vehicle diagnosis equipment exists in the vehicle diagnosis equipment management list, judging whether the target vehicle diagnosis equipment is in an online status or not; and Step S34, establishing the second socket connection with the target vehicle diagnosis equipment when the target vehicle equipment is in the online status.

In this embodiment, the way to establish a connection between the WEB server and target vehicle diagnosis equipment can be: the WEB service obtains the vehicle diagnosis equipment management list firstly, the list includes all the vehicle diagnosis equipment registered on the WEB server; afterwards, the WEB server checks whether the target vehicle diagnosis equipment exists in the vehicle diagnosis equipment management list or not according to the identification of the target vehicle diagnosis equipment; if yes, the WEB server judges whether the target vehicle diagnosis equipment is in the online status or not, and automatically establishes the second socket connection (i.e., the TCP/IP Socket connection) with the target vehicle diagnosis equipment when the target vehicle equipment is in the online status.

It should to be noted that the vehicle diagnosis equipment is in the online status indicates that the WEB server and the vehicle diagnosis equipment terminals are in the same wireless network, when the target vehicle equipment is powered on, it updates its online status and maintains a heartbeat connection to the Web server, and thus the WEB server shows that the vehicle diagnosis equipment is in an online status.

Further, after the Step S33, it may further comprise:

Step S35, judging whether the WEB server and the target vehicle diagnosis equipment are in a same wireless network or not when the target vehicle diagnosis equipment is in an offline status;

Step S36, if the WEB server and the target vehicle diagnosis equipment are in a same wireless network, sending a start instruction to the target vehicle diagnosis equipment via the wireless network;

Step S37, establishing a second socket connection with the target vehicle diagnosis equipment when it is detected that the target vehicle diagnosis equipment is activated.

When the target vehicle diagnosis equipment is in an offline status, it indicates that the WEB server is not on the same network as the target vehicle diagnosis equipment or that the target vehicle diagnosis equipment is dormant, and then the WEB server judges whether the WEB server and the target vehicle diagnosis equipment are in the same wireless network or not; if yes, a start instruction is sent to the target vehicle diagnosis equipment via the wireless network to control the recovery of the target vehicle diagnosis equipment from the dormant status, and the TCP/IP Socket connection with the target vehicle diagnosis equipment is established when the target vehicle diagnosis equipment is detected to start.

Certainly, the owner can also manually start the target vehicle diagnosis equipment and trigger the connection function to establish the connection with the WEB server, the specific implementation can be flexibly set.

The WEB server of the present embodiment connects with target vehicle diagnosis equipment automatically without the manual operation in the sites of the vehicles, such that the vehicle remote diagnosis is more intelligent and the user experience is enhanced.

The present application further provides a communication device for the vehicle remote diagnosis.

Figure 4:
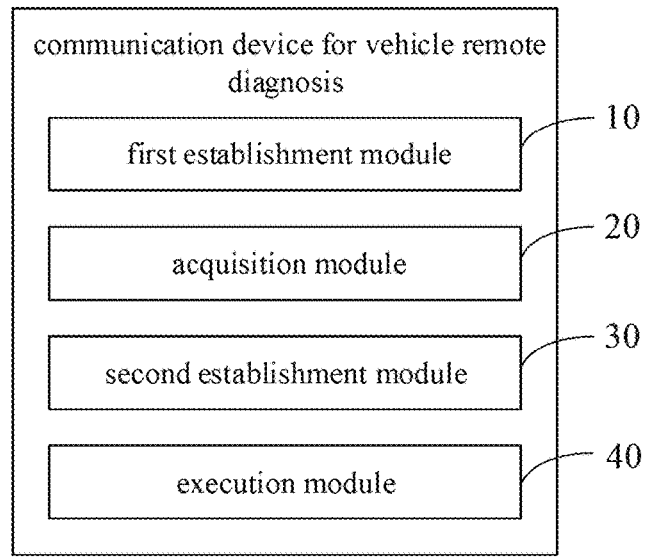
FIG. 4 is a functional module schematic diagram of one embodiment of communication device for vehicle remote diagnosis according to the present application.

With referring to FIG. 4, FIG. 4 is a functional module schematic diagram of one embodiment of communication device for vehicle remote diagnosis according to the present application. The communication device comprises a processor and a storage device storing computer programs which are in the form of software modules and are executable by the processor, wherein the processor implements the above-mentioned steps of the method for vehicle remote diagnosis when executing the computer programs, the computer programs comprise a first establishment module 10, an acquisition module 20, a second establishment module 30 and an execution module 40, wherein the first establishment module 10 which is configured to establish a first socket connection with the WEB front end when receiving a landing request of the WEB front end.

The communication device for vehicle remote diagnosis according to the present application is applied to the WEB server. First, the first establishment module 10 receives the landing request of the WEB front end, and establishes the first socket connection between the WEB server and the WEB front end, wherein the WEB front end includes the WEB page and the related code that can interact with the user. At present, the socket connection between the WEB front end and the WEB server is established on the fifth generation of hypertext markup language (HTML5), and the HTML5 is the network communication standards of hypertext markup language after a fifth major modification, the socket connection based on the standards can be recorded as HTML5 Websocket connection, a real-time interaction of the network can be supported by the connection.

The application scenario of the present embodiment can be that: the user needs to remotely diagnose his vehicle at a certain time when the user opens the browser using the mobile phone to access the corresponding website, and then inputs the user name and password on the webpage displayed on the website and sends the landing request to the WEB server, the correctness of the username and the password will be verified by the WEB server when the landing request has been received, and the HTML5 Websocket connection with the WEB front end will be established if it is right.

In the above application scenario, the web front end used by the user can be any device that can access the network, such as a smartphone, tablet computer, notebook, etc., and a relevant diagnostic APP or the other diagnosis program do not need to be downloaded or installed in the near-end device by the user; in addition, the establishment of the HTML5 Websocket connection is also unaffected by the system platform of the near-end diagnosis equipment, that is, the web front end can carry any operating system, such as Windows, Linux, IOS, Android and so on. To smart phone, for example, the user can generally access to the corresponding automobile remote diagnosis website via commonly used mobile APPs, such as a browser or WetChat Official Accounts, and so on, and establish the HTML5 Websocket connection between the WEB front end (WEB page) and the WEB server, thus it is very convenient to use.

The acquisition module 20 which is configured to receive a vehicle remote diagnosis request of the WEB front end through the first socket connection and obtaining an identification of a target vehicle diagnosis equipment carried in the vehicle remote diagnosis request;

The second establishment module 30 which is configured to establish a second socket connection with the target vehicle diagnosis equipment according to the identification of the target vehicle diagnosis equipment;

When the HTML5 Websocket connection between the WEB server and the WEB front end has been established, the data interaction between the WEB server and WEB front end via the connection can be performed. Specifically, the user enters the target vehicle diagnosis equipment identification information that need to be connected through the WEB page, such as the device type, the name, etc., and sends the remote diagnosis request to the WEB server, the acquisition module 20 receives the vehicle remote diagnosis request of the WEB front end, the second establishment module 30 establishes the second socket connection between the WEB server and the target vehicle diagnosis equipment according to the target vehicle diagnosis equipment identification carried in the request, wherein this connection can be recorded as a TCP/IP Socket connection.

It should be noted that the target vehicle diagnosis device of the present embodiment is connected to an ECU for acquiring the vehicle original diagnosis data including the vehicle's real-time fuel consumption, engine water temperature, engine speed, vehicle mileage, current speed, battery voltage, intake pressure, coolant temperature, oxygen sensor voltage, engine load, throttle opening, ignition timing, air flow and the other data. The target vehicle diagnosis equipment includes, but is not limited to, such as OBD (On-Board Diagnostics) connectors, motor vehicle products, and the diagnosis equipment independently installed in the vehicle and connected with the CAN-BUS (Controller Area Network-BUS) and so on.

The execution module 40 for performing the interaction of a vehicle diagnosis data between the WEB front end and the target vehicle diagnosis equipment through the first socket connection and the second socket connection.

After the first socket connection (i.e., the HTML5 Websocket connection) has been established between the WEB server and the WEB front end, and the second socket connection (i.e., the TCP/IP Socket connection) has been established between the WEB server and the target vehicle diagnosis equipment, the execution module 40 can execute the interaction of the vehicle diagnosis data between the WEB front end and the target vehicle diagnosis equipment by the established first socket connection and the second socket connection.

In this embodiment, through the establishment of the first socket connection between the WEB server and the WEB front end, and the establishment of the second socket connection between the WEB server and the target vehicle diagnosis equipment, a real-time interaction of the vehicle diagnosis data can be performed between the WEB front end and the target vehicle diagnosis equipment via the WEB server, thereby improving the real-time performance and convenience of the vehicle remote diagnosis.

Further, with reference to FIG. 4, the execution module 40 is further configured to: obtaining the vehicle original diagnosis data collected by the target vehicle diagnosis equipment through the second socket connection; send the obtained vehicle original diagnosis data through the first socket connection to the WEB front end for display.

In this embodiment, the execution module 40 obtains the vehicle original diagnosis data collected by the target vehicle diagnosis equipment through the TCP/IP Socket connection and sends the obtained vehicle original diagnosis data through the HTML5 Websocket connection to the WEB front end for display, in this process, the vehicle original diagnosis data can be processed by the execution module 40 based on the HTML5 to ensure that its normal display on the diagnosis interface of the WEB front end. As the real-time performance of the data transmission of the Socket connection is very high, the diagnosis data on the diagnosis interface should be changed in real time, thus, the user can monitor the vehicle diagnosis data in real time though the WEB page.

Further, the execution module 40 is further configured to: receive through the first socket connection the vehicle remote diagnosis instruction sent from the WEB front end; send the received vehicle remote diagnosis instruction by the second socket connection to the target vehicle diagnosis equipment.

The user can remotely diagnose the vehicle according to the vehicle original diagnosis data displayed on tile WEB page. Specifically, the user can send the vehicle remote diagnosis instruction to the WEB server based on the WEB page, tile vehicle remote diagnosis instruction includes but not limited to fault diagnosis, fault clearing, real-time data reading, action testing (such as unlocking, whistle), ECU programming, ECU flushing and so on. The execution module 40 receives the vehicle remote diagnosis instruction sent from the WEB front end through the HTML5 Websocket connection and sends the received vehicle remote diagnosis instruction to the target vehicle diagnosis equipment through the TCP/IP Socket connection to enable the target vehicle diagnosis equipment to control the vehicle ECU unit to perform the corresponding function. As the data transmission of the Socket connection supports the bidirectional transmission, the user can obtain the current diagnosis status and the diagnosis results of the vehicle through the diagnosis interface, thereby achieving the user's remote diagnosis of the vehicle.

In this embodiment, through the establishment of the first socket connection (i.e., the HTML5 Websocket) between the WEB server and the WEB front end, and the establishment of the second socket connection (i.e., the TCP/IP Socket connection) between the WEB server and the target vehicle diagnosis equipment, the user can perform the real-time data exchange through the display interface of the WEB front end and the ECU unit of the vehicle, thereby improving the real-time performance and convenience of the vehicle remote diagnosis.

Further, with reference to FIG. 4, the second establishment module 30 is further configured to: obtain a vehicle diagnosis equipment management list; check whether tile target vehicle diagnosis equipment exists in the vehicle diagnosis equipment management list or not according to the identification of tile target vehicle diagnosis equipment; if yes, judge whether the target vehicle diagnosis equipment is in an online status or not; establish the second socket connection with the target vehicle diagnosis equipment when the target vehicle equipment is in tile online status.

In this embodiment, the way to establish a connection between the WEB server and target vehicle diagnosis equipment can be: the second establishment module 30 obtains the vehicle diagnosis equipment management list firstly, the list includes all the vehicle diagnosis equipment registered on the WEB server; afterwards, the WEB server checks whether the target vehicle diagnosis equipment exists in the vehicle diagnosis equipment management list or not according to the identification of the target vehicle diagnosis equipment; if yes, the WEB server 101 judges whether the target vehicle diagnosis equipment is in the online status or not, and automatically establishes the second socket connection (i.e., the TCP/IP Socket connection) with the target vehicle diagnosis equipment when the target vehicle equipment is in the online status.

It should to be noted that the vehicle diagnosis equipment is in the online status indicates that the WEB server and the vehicle diagnosis equipment terminals are in the same wireless network, when the target vehicle equipment is powered on, it updates its online status and maintain a heartbeat connection to the Web server, and thus the WEB server shows that the vehicle diagnosis equipment is in an online status.

Further, the second establishment module 30 is further configured to: judge whether the WEB server and the target vehicle diagnosis equipment are in the same wireless network or not when the target vehicle diagnosis equipment is in an offline status; if yes, send a start instruction to the target vehicle diagnosis equipment via the wireless network; establish a second socket connection with the target vehicle diagnosis equipment when it is detected that the target vehicle diagnosis equipment is activated.

When the target vehicle diagnosis equipment is in an offline status, it indicates that the WEB server is not on the same network as the target vehicle diagnosis equipment or that the target vehicle diagnosis equipment is dormant, and then the second establishment module 30 judges whether the WEB server and the target vehicle diagnosis equipment are in the same wireless network or not, if yes, a start instruction is sent to the target vehicle diagnosis equipment via the wireless network to control the recovery of the target vehicle diagnosis equipment from the dormant status, and the TCP/IP Socket connection with the target vehicle diagnosis equipment is established when the target vehicle diagnosis equipment is detected to start.

Certainly, the owner can also manually start the target vehicle diagnosis equipment and trigger the connection function to establish the connection with the WEB server, the specific implementation can be flexibly set.

The WEB server of the present embodiment connects with target vehicle diagnosis equipment automatically without the manual operation in the sites of the vehicles, such that the vehicle remote diagnosis is more intelligent and the user experience is enhanced.

A communication device for vehicle remote diagnosis, which is applied to a WEB server, comprising: a memory configured to store a program code; and a processor coupled to the memory, wherein the program code causes the processor to be configured to:

establish a first socket connection with a WEB front end when receiving a landing request of the WEB front end;

receive a vehicle remote diagnosis request of the WEB front end through the first socket connection and obtaining an identification of a target vehicle diagnosis equipment cat tied in the vehicle remote diagnosis request;

establish a second socket connection with the target vehicle diagnosis equipment according to the identification of the target vehicle diagnosis equipment; and perform the interaction of a vehicle diagnosis data between the WEB front end and the target vehicle diagnosis equipment through the first socket connection and the second socket connection.

According to the above-mentioned communication device for vehicle remote diagnosis, the program code causes the processor to be configured to perform the interaction of a vehicle diagnosis data between the WEB front end and the target vehicle diagnosis equipment through the first socket connection and the second socket connection specifically comprises:

obtaining the vehicle original diagnosis data collected by the target vehicle diagnosis equipment through the second socket connection; and sending the obtained vehicle original diagnosis data through the first socket connection to the WEB front end for display.

According to the above-mentioned communication device for vehicle remote diagnosis, after sending the obtained vehicle original diagnosis data through the first socket connection to the WEB front end for display, the program code further causes the processor to be configured to:

receive through the first socket connection the vehicle remote diagnosis instruction sent from the WEB front end; and send the received vehicle remote diagnosis instruction by the second socket connection to the target vehicle diagnosis equipment.

According to the above-mentioned communication device for vehicle remote diagnosis, the program code causes the processor to be configured to establish the second socket connection with the target vehicle diagnosis equipment according to the identification of the target vehicle diagnosis equipment, specifically comprises:

obtaining a vehicle diagnosis equipment management list;

checking whether the target vehicle diagnosis equipment exists in the vehicle diagnosis equipment management list or not according to the identification of the target vehicle diagnosis equipment;

if yes, judging whether the target vehicle diagnosis equipment is in an online status or not; and establishing the second socket connection with the target vehicle diagnosis equipment when the target vehicle equipment is in the online status.

According to the above-mentioned communication device for vehicle remote diagnosis, after judging whether the target vehicle diagnosis equipment is in the online status or not, the program code further causes the processor to be configured to:

judge whether the WEB server and the target vehicle diagnosis equipment are in a same wireless network or not when the target vehicle diagnosis equipment is in an offline status;

if yes, send a start instruction to the target vehicle diagnosis equipment via the wireless network; and establish a second socket connection with the target vehicle diagnosis equipment when it is detected that the target vehicle diagnosis equipment is activated.

The memory can be configured to a computer readable storage medium, and the program code is stored in the computer readable storage medium in the form of software modules/units and executed by the processor, the program code implement the above-mentioned steps of communication method for the vehicle remote diagnosis.

The present application further provides a communication system for the vehicle remote diagnosis.

Figure 5:
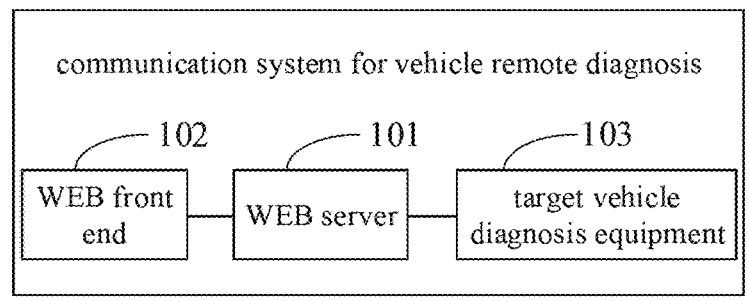
FIG. 5 is a functional module schematic diagram of one embodiment of communication system for vehicle remote diagnosis according to the present application.

With reference to FIG. 5, FIG. 5 is a functional module schematic diagram of one embodiment of communication system for vehicle remote diagnosis according to the present application. 1. The system comprises a WEB server 101, a WEB front end 102 and a target vehicle diagnosis equipment 103, wherein, the WEB server 101 comprises the device described above;

the WEB front end 102 is configured to send a landing request to the WEB server 101 and establish a first socket connection with the WEB server 101; and to send a vehicle remote diagnosis request to the WEB server 101 through the first socket connection, wherein the vehicle remote diagnosis request carries an identification of the target vehicle diagnosis equipment 103;

the target vehicle diagnosis equipment 103 is configured to establish a second socket connection with the WEB server 101.

Figure 6:
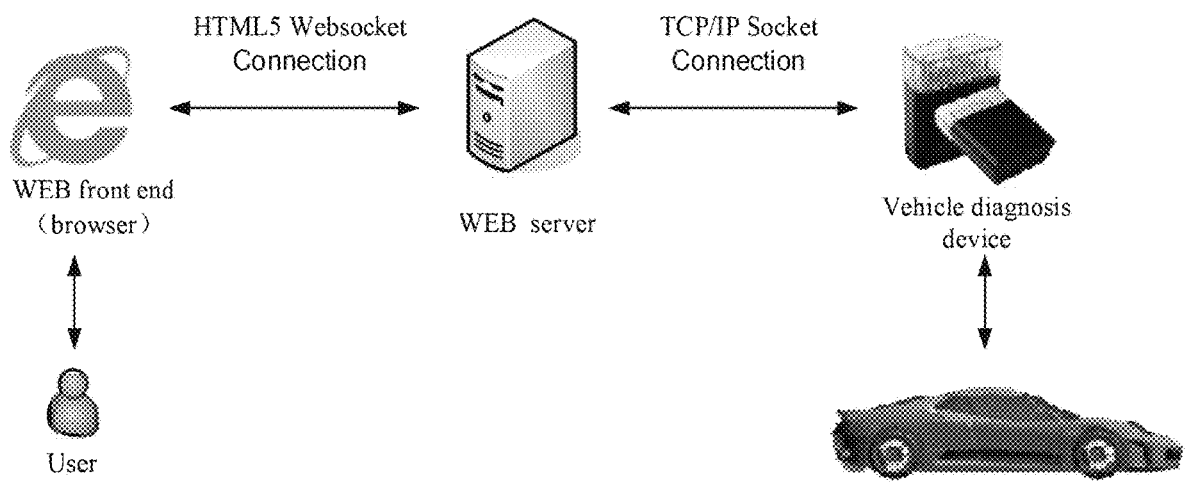
FIG. 6 is an application scenario schematic diagram of one embodiment of communication system for vehicle remote diagnosis according to the present application.

With reference to FIG. 6, FIG. 6 is an application scenario schematic diagram of one embodiment of communication system for vehicle remote diagnosis according to the present application.

When the user need to remotely diagnose their own vehicle, the user opens a relevant browser using the web front end, and sends the landing request to the WEB server 101 by the WEB front end 102 (WEB page), the WEB server 101 receives the landing request of the WEB front end 102, and establishes the first socket connection with WEB front end 102, wherein the WEB front end 102 includes the WEB page and the related code that can interact with the user. At present, the socket connection between the WEB front end and the WEB server is established on the fifth generation of hypertext markup language (HTML5), and the HTML5 is the network communication standards of hypertext markup language after a fifth major modification, the socket connection based on the standards can be recorded as HTML5 Websocket connection, a real-time interaction of the network can be supported by the connection.

The web front end used by the user can be any device that can access the network, such as a smartphone, tablet computer, notebook, etc., and a relevant diagnostic APP or the other diagnosis program do not need to be downloaded or installed in the near-end device by the user; in addition, the establishment of the HTML5 Websocket connection is also unaffected by the system platform of the near-end diagnosis equipment, that is, the web front end can carry any operating system, such as Windows, Linux, IOS, Android and so on. To smart phone, for example, the user can generally access to the corresponding automobile remote diagnosis website via commonly used mobile APPs, such as a browser or WetChat Official Accounts, and so on, and establish the HTML5 Websocket connection between the WEB front end (WEB page) and the WEB server, thus it is very convenient to use.

When the HTML5 Websocket connection between the WEB server 101 and the WEB front end 102 has been established, the data interaction between the WEB server 101 and WEB front end 102 via the connection can be performed. Specifically, the user enters the target vehicle diagnosis equipment 103 identification information that need to be connected through the WEB page, such as the device type, the name, etc., and sends the remote diagnosis request to the WEB server 101, and the WEB server 101 receives the vehicle remote diagnosis request of the WEB front end 102, the second socket connection with the target vehicle diagnosis equipment 103 is established according to the target vehicle diagnosis equipment 103 identification carried in the request, wherein this connection can be recorded as a TCP/IP Socket connection.

It should be noted that the target vehicle diagnosis device 103 of the present embodiment is connected to an ECU for acquiring the vehicle original diagnosis data including the vehicle's real-time fuel consumption, engine water temperature, engine speed, vehicle mileage, current speed battery voltage, intake pressure, coolant temperature, oxygen sensor voltage, engine load, throttle opening, ignition timing, air flow and the other data. The target vehicle diagnosis equipment 103 includes, but is not limited to, such as OBD (On-Board Diagnostics) connectors, motor vehicle products, and the diagnosis equipment independently installed in the vehicle and connected with the CAN-BUS (Controller Area Network-BUS) and so on.

After the first socket connection (i.e., the HTML5 Websocket connection) has been established between the WEB server 101 and the WEB front end 102, and the second socket connection (i.e., the TCP/IP Socket connection) has been established between the WEB server and the target vehicle diagnosis equipment 103, and the interaction of the vehicle diagnosis data between the WEB front end 102 and the target vehicle diagnosis equipment 103 will be executed by the established first socket connection and the second socket connection.

In this embodiment, through the establishment of the first socket connection based on the HTML5 between the WEB server and the WEB front end, and the establishment of the second socket connection between the WEB server and the target vehicle diagnosis equipment, a real-time interaction of the vehicle diagnosis data can be performed between the WEB front end and the target vehicle diagnosis equipment via the WEB server, thereby improving the real-time performance and convenience of the vehicle remote diagnosis.

Further, the target vehicle diagnosis equipment 103 is further configured to acquire vehicle original diagnosis data, and send the acquired vehicle original diagnosis data to the target vehicle diagnosis equipment through the second socket connection; the WEB front end 102 is further configured to display the vehicle original diagnosis data sent from the WEB server 101 through the first socket connection.

In this embodiment, the WEB server 101 obtains the vehicle original diagnosis data collected by the target vehicle diagnosis equipment 103 through the TCP/IP Socket connection and sends the obtained vehicle original diagnosis data through the HTML5 Websocket connection to the WEB front end 102 for display, in this process, the vehicle original diagnosis data can be processed by the WEB server 101 based on the HTML5 to ensure that its normal display on the diagnosis interface of the WEB front end 102. As the real-time performance of the data transmission of the Socket connection is very high, the diagnosis data on the diagnosis interface should be changed in real time, thus, the user can monitor the vehicle diagnosis data in real time though the WEB page.

Further, the WEB front end 102 is further configured to send a vehicle remote diagnosis instruction to the WEB server 101 through the first socket connection; the target vehicle diagnosis equipment 103 is further configured to receive through the second socket connection the vehicle remote diagnosis instruction sent from the WEB front end 102.

The user can remotely diagnose the vehicle according to the vehicle original diagnosis data displayed on the WEB page. Specifically, the user can send the vehicle remote diagnosis instruction to the WEB server based on the WEB page, the vehicle remote diagnosis instruction includes but not limited to fault diagnosis, fault clearing, real-time data reading, action testing (such as unlocking, whistle), ECU programming, ECU flushing and so on. The WEB server 101 receives the vehicle remote diagnosis instruction sent from the WEB front end through the HTML5 Websocket connection and sends the received vehicle remote diagnosis instruction to the target vehicle diagnosis equipment through the TCP/IP Socket connection to enable the target vehicle diagnosis equipment to control the vehicle ECU unit to perform the corresponding function. As the data transmission of the Socket connection supports the bidirectional transmission, the user can obtain the current diagnosis status and the diagnosis results of the vehicle through the diagnosis interface, thereby achieving the user's remote diagnosis of the vehicle.

In this embodiment, through the establishment of the first socket connection the HTML5 Websocket) between the WEB server and the WEB front end, and the establishment of the second socket connection (i.e., the TCP/IP Socket connection) between the WEB server and the target vehicle diagnosis equipment, the user can perform the real-time data exchange through the display interface of the WEB front end and the ECU unit of the vehicle, thereby improving the real-time performance and convenience of the vehicle remote diagnosis.

Further, the target vehicle diagnosis equipment 103 is further configured to establish the second socket connection with the WEB server 101 when it exists in a vehicle diagnosis equipment management list of the WEB server 101 and is in the online status.

In this embodiment, the way to establish a connection between the WEB server 101 and target vehicle diagnosis equipment 103 can be: the WEB service 101 obtains the vehicle diagnosis equipment management list firstly, the list includes all the vehicle diagnosis equipment registered on the WEB server 101; afterwards, the WEB server 101 checks whether the target vehicle diagnosis equipment 103 exists in the vehicle diagnosis equipment management list or not according to the identification of the target vehicle diagnosis equipment 103, if yes, the WEB server 101 judges whether the target vehicle diagnosis equipment 103 is in the online status or not, and automatically establishes the second socket connection (i.e., the TCP/IP Socket connection) with the target vehicle diagnosis equipment 103 when the target vehicle equipment 103 is in the online status.

It should to be noted that the vehicle diagnosis equipment is in the online status indicates that the WEB server 101 and the vehicle diagnosis equipment terminals are in the same wireless network, when the target vehicle equipment is powered on, it updates its online status and maintain a heartbeat connection to the Web server 101, and the WEB server shows that the vehicle diagnosis equipment is in an online status.

Further, the target vehicle diagnosis equipment 103 is further configured to receive a start instruction of the WEB server 101 when it exists in the vehicle diagnosis equipment management list of the WEB server 101 and is in an offline status; and establish the second socket connection with the WEB server 101 according to the start instruction.

When the target vehicle diagnosis equipment 103 is in an offline status, it indicates that the WEB server 101 is not on the same network as the target vehicle diagnosis equipment 103 or that the target vehicle diagnosis equipment 103 is dormant, and then the WEB server 101 judges whether the WEB server and the target vehicle diagnosis equipment 103 are in the same wireless network or not, if yes, a start instruction is sent to the target vehicle diagnosis equipment 103 via the wireless network to control the recovery of the target vehicle diagnosis equipment 103 from the dormant status, and the TCP/IP Socket connection with the target vehicle diagnosis equipment 103 is established when the target vehicle diagnosis equipment is detected to start.

Certainly, the owner can also manually start the target vehicle diagnosis equipment 103 and trigger the connection function to establish the connection with the WEB server 101, the specific implementation can be flexibly set.

The WEB server of the present embodiment connects with target vehicle diagnosis equipment automatically without the manual operation in the sites of the vehicles, such that the vehicle remote diagnosis is more intelligent and the user experience is enhanced.

The aforementioned embodiments are only preferred embodiments of the present application, and are not intended for limiting the present application. Any modification, equivalent replacement, improvement, and so on, which are made within the spirit and the principle of the present application, should be included in the protection scope of the present application.

The invention claimed is:

1. A communication method for vehicle remote diagnosis, which is applied to a WEB server; wherein the method comprises the following steps:
   establishing a first socket connection supporting a real-time interaction with a WEB front end when receiving a landing request of the WEB front end;
   receiving a vehicle remote diagnosis request of the WEB front end through the first socket connection and obtaining an identification of a target vehicle diagnosis equipment carried in the vehicle remote diagnosis request;
   establishing a second socket connection supporting the real-time interaction with the target vehicle diagnosis equipment according to the identification of the target vehicle diagnosis equipment; and
   performing the real-time interaction of vehicle diagnosis data between the WEB front end and the target vehicle diagnosis equipment through the first socket connection and the second socket connection.

2. The communication method for vehicle remote diagnosis of claim 1, wherein the steps of performing the real-time interaction of the vehicle diagnosis data between the WEB front end and the target vehicle diagnosis equipment through the first socket connection and the second socket connection comprises:
   obtaining the vehicle original diagnosis data collected by the target vehicle diagnosis equipment through the second socket connection; and
   sending the obtained vehicle original diagnosis data through the first socket connection to the WEB front end for display.

3. The communication method for vehicle remote diagnosis of claim 2, wherein after the step of sending the obtained vehicle original diagnosis data through the first socket connection to the WEB front end for display, the method further comprises:
   receiving a vehicle remote diagnosis instruction sent from the WEB front end through the first socket connection; and
   sending the received vehicle remote diagnosis instruction by the second socket connection to the target vehicle diagnosis equipment.

4. The communication method for vehicle remote diagnosis of claim 1, wherein the step of establishing the second socket connection with the target vehicle diagnosis equipment according to the identification of the target vehicle diagnosis equipment comprises:
   obtaining a vehicle diagnosis equipment management list;
   checking whether the target vehicle diagnosis equipment exists in the vehicle diagnosis equipment management list or not according to the identification of the target vehicle diagnosis equipment;
   if yes, judging whether the target vehicle diagnosis equipment is in an online status or not; and
   establishing the second socket connection with the target vehicle diagnosis equipment when the target vehicle equipment is in the online status.

5. The communication method for vehicle remote diagnosis of claim 4, wherein after the step of judging whether the target vehicle diagnosis equipment is in the online status or not, the method further comprises:
   judging whether the WEB server and the target vehicle diagnosis equipment are in a same wireless network or not when the target vehicle diagnosis equipment is in an offline status;
   if yes, sending a start instruction to the target vehicle diagnosis equipment via the wireless network; and
   establishing a second socket connection with the target vehicle diagnosis equipment when it is detected that the target vehicle diagnosis equipment is activated.

6. A communication device for vehicle remote diagnosis, which is applied to a WEB server, comprising: a memory configured to store a program code; and a processor coupled to the memory, wherein the program code causes the processor to be configured to:
   establish a first socket connection supporting a real-time interaction with a WEB front end when receiving a landing request of the WEB front end;
   receive a vehicle remote diagnosis request of the WEB front end through the first socket connection and obtaining an identification of a target vehicle diagnosis equipment carried in the vehicle remote diagnosis request;
   establish a second socket connection supporting the real-time interaction with the target vehicle diagnosis equipment according to the identification of the target vehicle diagnosis equipment; and
   perform the real-time interaction of a vehicle diagnosis data between the WEB front end and the target vehicle diagnosis equipment through the first socket connection and the second socket connection.

7. The communication device for vehicle remote diagnosis of claim 6, wherein the program code causes the processor to be configured to perform the real-time interaction of a vehicle diagnosis data between the WEB front end and the target vehicle diagnosis equipment through the first socket connection and the second socket connection, specifically comprises:
   obtaining the vehicle original diagnosis data collected by the target vehicle diagnosis equipment through the second socket connection; and
   sending the obtained vehicle original diagnosis data through the first socket connection to the WEB front end for display.

8. The communication device for vehicle remote diagnosis of claim 7, wherein after sending the obtained vehicle original diagnosis data through the first socket connection to the WEB front end for display, the program code further causes the processor to be configured to:
   receive through the first socket connection the vehicle remote diagnosis instruction sent from the WEB front end; and
   send the received vehicle remote diagnosis instruction by the second socket connection to the target vehicle diagnosis equipment.

9. The communication device for vehicle remote diagnosis of claim 6, wherein the program code causes the processor to be configured to establish the second socket connection with the target vehicle diagnosis equipment according to the identification of the target vehicle diagnosis equipment, specifically comprises:

obtaining a vehicle diagnosis equipment management list;

checking whether the target vehicle diagnosis equipment exists in the vehicle diagnosis equipment management list or not according to the identification of the target vehicle diagnosis equipment;

if yes, judging whether the target vehicle diagnosis equipment is in an online status or not; and establishing the second socket connection with the target vehicle diagnosis equipment when the target vehicle equipment is in the online status.

10. The communication device for vehicle remote diagnosis of claim 9, wherein after judging whether the target vehicle diagnosis equipment is in the online status or not, the program code further causes the processor to be configured to:

judge whether the WEB server and the target vehicle diagnosis equipment are in a same wireless network or not when the target vehicle diagnosis equipment is in an offline status;

if yes, send a start instruction to the target vehicle diagnosis equipment via the wireless network; and establish a second socket connection with the target vehicle diagnosis equipment when it is detected that the target vehicle diagnosis equipment is activated.

11. A communication system for vehicle remote diagnosis, wherein the system comprises a WEB server, a WEB front end and a target vehicle diagnosis equipment, wherein, the WEB server comprises the device of claim 6;

the WEB front end is configured to send a landing request to the WEB server and establish a first socket connection with the WEB server; and to send a vehicle remote diagnosis request to the WEB server through the first socket connection, wherein the vehicle remote diagnosis request carries an identification of a target vehicle diagnosis equipment; and the target vehicle diagnosis equipment is configured to establish a second socket connection with the WEB server.

12. The communication system of claim 11, wherein, the target vehicle diagnosis equipment is further configured to acquire vehicle original diagnosis data, and send acquired the vehicle original diagnosis data to the target vehicle diagnosis equipment through the second socket connection; and the WEB front end is further configured to display the vehicle original diagnosis data sent from the WEB server through the first socket connection.

13. The communication system of claim 12, wherein, the WEB front end is further configured to send a vehicle remote diagnosis instruction to the WEB server through the first socket connection; and the target vehicle diagnosis equipment is further configured to receive through the second socket connection the vehicle remote diagnosis instruction sent from the WEB front end.

14. The communication system of claim 11, wherein, the target vehicle diagnosis equipment is further configured to: establish the second socket connection with the WEB server when it exists in a vehicle diagnosis equipment management list of the WEB server and is in an online status.

15. The communication system of claim 14, wherein, the target vehicle diagnosis equipment is further configured to: receive a start instruction of the WEB server when it exists in the vehicle diagnosis equipment management list of the WEB server and is in an offline status; and establish the second socket connection with the WEB server according to the start instruction.

* * * * *